United States Patent
Nakamura et al.

(10) Patent No.: US 6,753,397 B2
(45) Date of Patent: Jun. 22, 2004

(54) RESIN COMPOSITION, PRODUCTION METHOD OF BORON-CONTAINING POLYMER AND ANTIFOULING COATING

(75) Inventors: Isao Nakamura, Kyoto (JP); Naoki Yamamori, Kyotanabe (JP)

(73) Assignee: Nippon Paint Co., Ltd., Osaka (JP)

( * ) Notice: Subject to any disclaimer, the term of this patent is extended or adjusted under 35 U.S.C. 154(b) by 259 days.

(21) Appl. No.: 10/106,104

(22) Filed: Mar. 27, 2002

(65) Prior Publication Data

US 2003/0065120 A1 Apr. 3, 2003

(30) Foreign Application Priority Data

Mar. 28, 2001 (JP) .................................... 2001-094192

(51) Int. Cl.⁷ ............................................. G08G 79/08
(52) U.S. Cl. ......................... 528/7; 526/239; 525/360
(58) Field of Search ............................ 528/7; 525/360; 526/239

(56) References Cited

U.S. PATENT DOCUMENTS

| | | | | |
|---|---|---|---|---|
| 3,211,679 A | | 10/1965 | Updegraff | |
| 5,401,809 A | * | 3/1995 | Gitzel et al. | 525/337 |
| 5,952,409 A | * | 9/1999 | Boardman et al. | 524/185 |
| 5,994,484 A | * | 11/1999 | Pocius | 526/196 |
| 6,660,785 B2 | * | 12/2003 | Klee et al. | 523/116 |

FOREIGN PATENT DOCUMENTS

| | | |
|---|---|---|
| EP | 0 2 86 243 A1 | 10/1988 |
| EP | 1 0 86 996 A1 | 3/2001 |
| GB | 2257154 A | 1/1993 |
| WO | WO 91/15546 A1 | 10/1991 |
| WO | WO 98/33829 A1 | 8/1998 |
| WO | WO 01/05848 A1 | 1/2001 |

OTHER PUBLICATIONS

Abstract JP 74020615, Jul. 17, 1969.*
JP 2000 143673 abstract.
JP 11 323210 abstract.
JP 11 323209 abstract.
JP 06 220362 abstract.

* cited by examiner

Primary Examiner—Margaret G. Moore
(74) Attorney, Agent, or Firm—Sughrue Mion, PLLC

(57) ABSTRACT

The present invention is to provide a resin composition comprising a boron-containing polymer useful as an antifouling coating which does not contain heavy metal from an environmental viewpoint.

Thus, the present invention provides a resin composition which comprises a boron-containing polymer having, in a side chain or at a terminal thereof, at least one group represented by the following formula (1):

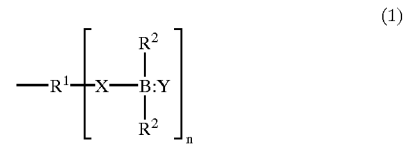

in the formula, $R^1$ is a part of an acid group; $R^2$ groups are the same or different and each represents a substituted or unsubstituted alkyl or aryl; X represents an oxygen or sulfur atom; Y represents a primary to tertiary amine or a heterocyclic compound containing a substituted or unsubstituted nitrogen atom; and n is 1 or 2.

13 Claims, No Drawings

RESIN COMPOSITION, PRODUCTION METHOD OF BORON-CONTAINING POLYMER AND ANTIFOULING COATING

TECHNICAL FIELD

The present invention relates to a resin composition comprising a boron-containing polymer and in particular to a resin composition comprising a boron-containing polymer useful as an antifouling coating.

BACKGROUND OF THE INVENTION

Aquatic creatures such as barnacles, ascidians, pylopagurus serpulophilus, blue mussels, bugula neritina, green layer and sea lettuce adhere to various substances below the water surface, to cause a wide variety of damage. For example, when these aquatic creatures adhere to the body of a ship, the velocity of the ship is lowered and the fuel cost is increased. Further, it is known that when the aquatic creatures adhere to fishing nets etc., the net maybe clogged to cause death of fish.

For preventing adhesion and growth of aquatic creatures on substances below the water surface, an antifouling coating is used, and there has been used an anti fouling coating comprising seawater-insoluble vinyl resin and alkyd resin as binder resin and a trialkyl tin polymeric compound as a vehicle. However, there is anxiety about the adverse effect of the eluted trialkyl tin on the ecosystem, so there is demand for development of heavy metal-free antifouling coatings and antifouling agents.

Japanese Kokai Publication Hei-7-133207 discloses triphenyl borane-pyridine derivative complex compounds. Further, triphenyl borane-fatty amine complex compounds (Japanese Kokai Publication Hei-8-295608, Japanese Kokai Publication Hei-8-295609 etc.), triphenyl borane-hydroxyl group-containing amine complex compounds (Japanese Kokai Publication Hei-9-78007), triphenyl borane-higher fatty secondary or tertiary amine complex compounds (Japanese Kokai Publication Hei-10-182322) etc. are also proposed.

For the purpose of expressing an antifouling effect for a prolonged period of time with good coating workability, Japanese Kokai Publication Hei-11-322763 discloses triphenyl borane-alkoxyl group-containing amine complex compounds, and Japanese Kokai Publication Hei-11-323206 discloses triphenyl borane-(iso)nicotinate complex compounds.

Further, Japanese Kokai Publication Hei-11-199801 discloses, as a resin composition for heavy metal-free antifouling coatings, an antifouling coating composition comprising N atom-coordinated triaryl borane-containing polymer as a vehicle.

SUMMARY OF THE INVENTION

The object of the present invention is to provide a resin composition comprising a boron-containing polymer useful as an antifouling coating which does not contain heavy metal from an environmental viewpoint.

Thus, the present invention provides a resin composition which comprises a boron-containing polymer having, in a side chain or at a terminal thereof, at least one group represented by the following formula (1):

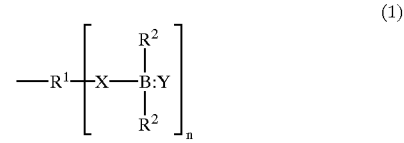

in the formula, $R^1$ is a part of an acid group; $R^2$ groups are the same or different and each represents a substituted or unsubstituted alkyl or aryl; X represents an oxygen or sulfur atom; Y represents a primary to tertiary amine or a heterocyclic compound containing a substituted or unsubstituted nitrogen atom; and n is 1 or 2.

Preferably, the above $R^1$ is represented by the following formula (2).

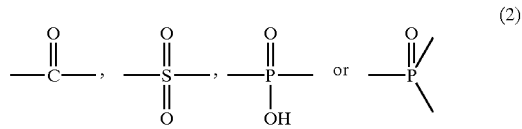

Further, the present invention provides a production method of a boron-containing polymer which comprises a step of reacting a polymer having at least one acid group in a side chain or at a terminal thereof, with a nitrogen atom-coordinated boron compound represented by the following formula (3):

in the formula, $R^2$ groups are the same or different and each represents a substituted or unsubstituted alkyl or aryl; and Y represents a primary to tertiary amine or a heterocyclic compound containing a substituted or unsubstituted nitrogen atom.

Preferably, the above acid group is a carboxylic acid group, a sulfonic acid group or a phosphoric acid group.

Furthermore, the present invention provides a production method of a boron-containing polymer which comprises a step (I) of reacting a polymerizable organic acid with a nitrogen atom-coordinated boron compound represented by the following formula (3):

in the formula, $R^2$ groups are the same or different and each represents a substituted or unsubstituted alkyl or aryl; and Y represents a primary to tertiary amine or a heterocyclic compound containing a substituted or unsubstituted nitrogen atom, and a step (II) of polymerizing a monomer component comprising a boron-containing polymerizable monomer obtained in said step (I).

Preferably, said polymerizable organic acid is a polymerizable organic carboxylic acid, a polymerizable organic sulfonic acid or a polymerizable organic phosphoric acid.

Moreover, the present invention provides a resin composition which comprises a boron-containing polymer obtainable by the above production method of the boron-containing polymer.

Moreover, the present invention provides an antifouling coating which comprises the above resin composition.

DETAILED DESCRIPTION OF THE INVENTION

The resin composition of the present invention comprises a boron-containing polymer having at least one group represented by the above formula (1) in a side chain or at a terminal thereof.

In the above formula (1), $R^1$ represents a part of an acid group. The above $R^1$ is preferably a part of carboxylic acid group, sulfonic acid group or phosphoric acid group represented by the above formula (2). The $R^1$ is more preferably a part of carboxylic acid group.

The above $R^1$ constitutes an acid group in the form of —$R^1$ (X—H)n.

The above X represents an oxygen or sulfur atom. It is preferably an oxygen atom.

In the above formula (1), n is 1 or 2. When a part of acid group as the above $R^1$ is a part of phosphoric acid group, n can be 2.

In the above formula (1), $R^2$ groups are the same or different and each represents a substituted or unsubstituted alkyl or aryl. The above alkyl group may be linear or branched.

The number of carbon atoms in the alkyl or aryl group is preferably 1 to 30. If the number of carbon atoms is 30 or more, the antifouling property will be deteriorated when the composition is incorporated into an antifouling coating so that it will be necessary to be incorporated in a large amount, in some cases. Further, the resulting resin composition may be hardly dissolved in an organic solvent and is inferior in handling properties. The number of carbon atoms therein is more preferably 1 to 20.

The substituent group on the above alkyl or aryl includes an alkyl group, carboxyl group, sulfonic acid group, phosphoric acid group, hydroxyl group, alkoxyl group, halogen, nitro group, carbonyl group, amino group, etc. These may be linear or branched.

The above alkyl and substituted alkyl are not particularly limited, and include, for example, methyl, ethyl, n-propyl, i-propyl, n-butyl, i-butyl, etc. The above aryl and substituted aryl include a phenyl group, tolyl group, xylyl group, etc. The phenyl group is preferable from the viewpoint of the antifouling property.

In the above formula (1), Y represents a primary to tertiary amine or a heterocyclic compound containing a substituted- or unsubstituted nitrogen atom.

The above primary to tertiary amine is not particularly limited, and includes, for example, alkyl group-containing amines such as octadecyl amine, capryl amine, lauryl amine, myristyl amine, stearyl amine, dimethyl amine, triethyl amine etc.; acyl group-containing amines such as acetyl amine etc.; alkoxyl group-containing amines such as 3-ethoxypropyl amine, ethoxymethyl amine etc.; aryl group-containing amines such as aniline, hexyl aniline etc.; allyl amine, vinyl amine, aminostyrene, etc.

The above heterocyclic compound containing a nitrogen atom may be polycyclic where one ring is preferably a 4- to 10-memberred ring. The heterocyclic compound can also contain an oxygen atom and/or a sulfur atom as the hetero atom in addition to the nitrogen atom thereof, and the number of hetero atoms including the nitrogen atom may be 1 to 4.

In the relationship with the above primary to tertiary amine, the heterocyclic compound containing a nitrogen atom refers to the one having the nitrogen atom as a hetero atom constituting the heterocyclic ring, and encompasses both saturated rings and condensed rings containing a double bond in its ring such as pyridine etc.

The above heterocyclic compound containing a nitrogen atom is not particularly limited, and includes, for example, pyridine, pyrrole, pyrazol, isoxazole, pyrazine, pyrimidine, imidazole, quinoline, indole, carbazole, phenanthroline; and heterocyclic compounds having a substituent group, such as ethyl pyridine, nicotinic acid, octylnicotinate, vinyl pyridine, allyl pyridine, etc. The above substituent group includes those specifically mentioned hereinabove.

The number of carbon atoms in the Y as a whole is preferably 1 to 30. If the number of carbon atoms exceeds 30, the antifouling property will be deteriorated when the composition is incorporated into the antifouling coating so that it will be necessary to be incorporated in a large amount, in some cases. Further, the resulting composition may be hardly dissolved in an organic solvent, and is inferior in handling properties. The number of carbon atoms therein is more preferably 1 to 20.

In the present invention, the above Y is preferably a primary amine, pyridine, or pyridine having a substituted group.

The boron-containing polymer having at least one group represented by the above formula (1) has preferably a number average molecular weight of 2000 to 40000. If the molecular weight is less than 2000, the resultant resin composition is poor in the film forming ability and may cause abnormalities in the coating film, such as cracking, peeling etc., while if the molecular weight exceeds 40000, the viscosity of the coating will be increased to cause inferior in handling properties, in some cases.

The number average molecular weight mentioned above is determined by gel permeation chromatography using polystyrene standards.

The boron-containing polymer having at least one group represented by the above formula (1) can be produced by reacting a polymer having at least one acid group in a side chain or at a terminal thereof, with the nitrogen atom-coordinated boron compound represented by the above formula (3). This production method also falls under the scope of the present invention.

The above acid group is preferably a carboxylic acid group, a sulfonic acid group or a phosphoric acid group. It is more preferably a carboxylic acid group.

The polymer having at least one acid group in a side chain or at a terminal thereof is not particularly limited insofar as it has at least one acid group described above, and examples thereof include an acrylic resin, polyester resin, alkyd resin, epoxy resin, etc. The acrylic resin is preferable from the viewpoint of the antifouling property.

The production method of the polymer having at least one acid group in a side chain or at a terminal thereof can be a process known in the art. For example, the acrylic resin can be obtained by copolymerizing a polymerizable monomer having an acid group with other monomers as necessary.

The above polymerizable monomer having an acid group includes monomers having a carboxylic acid group, such as methacrylic acid, acrylic acid, itaconic acid, monoalkyl itaconate, monoalkyl maleate (alkyl in the monoalkyl residue includes, for example, $C_{1-20}$ alkyl such as methyl, ethyl, butyl, 2-ethylhexyl, etc.), half esters of an OH group-containing polymerizable unsaturated monomer and an acid anhydride, for example, half esters of 2-hydroxyethyl (meth) acrylate and succinic anhydride, maleic anhydride, or phthalic anhydride; monomers having a sulfonic acid group, such asp-styrene sulfonic acid, 2-methyl-2-acrylamide propane sulfonic acid etc.; and monomers having a phosphoric acid group, such as phosphoxypropyl methacrylate, 3-chloro-2-phosphoxypropyl methacrylate, phosphoxyethyl methacrylate etc.

The above-mentioned other monomers are not particularly limited and include, for example, (meth)acrylates containing 1 to 30 carbon atoms preferably 1 to 20 carbon atoms in the ester moiety thereof, such as methyl (meth)acrylate, ethyl (meth)acrylate, i-propyl (meth)acrylate, n-butyl (meth) acrylate, i-butyl (meth) acrylate, t-butyl (meth) acrylate, 2-ethylhexyl (meth)acrylate, lauryl (meth)acrylate, stearyl (meth)acrylate, 2-hydroxypropyl (meth)acrylate, 2-hydroxyethyl (meth)acrylate, phenyl (meth)acrylate, cyclohexyl (meth)acrylate, polyethylene glycol mono (meth) acrylate, etc.; and (meth)acrylamide, styrene, vinyl acetate, acrylonitrile, etc.

These monomers may be used singly or in combination of two or more species.

The above copolymerization method is not particularly limited, and for example, mention can be made of a method in which the polymerizable monomer having an acid group and other monomers as necessary are mixed with a polymerization initiator to prepare a mixed solution and then the mixed solution is added dropwise to an organic solvent such as xylene, n-butanol etc., and is allowed to react under heating.

The acid value of the polymer having at least one acid group in a side chain or at a terminal thereof obtained in the manner described above is preferably 20 to 400 mg KOH/g. Given an acid value of less than 20 mg KOH/g, the antifouling property of the resulting coating film may be insufficient due to a decreased amount of the nitrogen atom-coordinated boron compound bound to the polymer, while given an acid value of more than 400 mg KOH/g, the speed of elution of the resulting coating film in water may be too rapid to secure the antifouling property for a long period of time. The acid value is more preferably 30 to 250 mg KOH/g. The above acid value is a design value and can be determined according to the species and amount of the monomer to be used.

The nitrogen atom-coordinated boron compound is represented by the above formula (3). In the above formula (3), $R^2$ groups are the same or different and each represents a substituted or unsubstituted alkyl or aryl, and Y represents a primary to tertiary amine or a heterocyclic compound containing a substituted or unsubstituted nitrogen atom. The above $R^2$ and Y include those specifically mentioned hereinabove.

The above nitrogen atom-coordinated boron compound can be produced in high yield as a stable compound having a nitrogen atom coordinated to boron, by reacting a tri-substituted boron compound to which a basic compound such as sodium hydroxide has been added, with the primary to tertiary amine or the heterocyclic compound containing a substituted or unsubstituted nitrogen atom represented by Y. However, a tri-substituted boron compound to which a basic compound has not been added, for example triphenyl boron etc., is often unstable as it is, and therefore when such a boron compound is reacted with the primary to tertiary amine or the heterocyclic compound containing a substituted or unsubstituted nitrogen atom, the yield becomes low.

The tri-substituted boron-compound used as a starting material of the above nitrogen atom-coordinated boron compound may be not only a commercially available product, but also a compound obtainable by reacting $BF_3 \cdot O(Et)_2$ (Et is ethyl) or the like with a Grignard reagent in THF or dry toluene.

The reaction of the above polymer having at least one acid group in a side chain or at a terminal thereof with the above nitrogen atom-coordinated boron compound can be conducted by charging the polymer having at least one acid group in a side chain or at a terminal thereof and the nitrogen atom-coordinated boron compound and then heating the mixture at about 50 to 120° C., preferably about 80° C. The order of the charging mentioned above is not particularly limited, but for example the polymer having at least one acid group in a side chain or at a terminal thereof maybe added dropwise to an organic solvent such as xylene in which the nitrogen atom-coordinated boron compound has been dissolved.

In the above reaction, the mixing ratio between the polymer having at least one acid group in a side chain or at a terminal thereof and the nitrogen atom-coordinated boron compound is generally selected such that 0.3 to 3 molecules, preferably 0.7 to 2 molecules, of the above nitrogen atom-coordinated boron compound are added per acid group into which the nitrogen atom-coordinated boron compound is to be introduced.

As the production method of a boron-containing polymer having at least one group represented by the above formula (1) in the present invention, there can also be mentioned a production method comprising a step (I) of reacting a polymerizable organic acid with the nitrogen atom-coordinated boron compound represented by the above formula (3) and a step (II) of polymerizing a monomer component comprising a boron-containing polymerizable monomer obtained in the above step (I). This production method also falls under the scope of the invention.

The above polymerizable organic acid is preferably a polymerizable organic carboxylic acid, a polymerizable organic sulfonic-acid or a polymerizable organic phosphoric acid. The above polymerizable organic acid is not particularly limited insofar as it is an organic acid having a polymerizable unsaturated double bond, and for example, mention can be made of those specifically mentioned herein above as the polymerizable unsaturated organic acid having an acid group.

The nitrogen atom-coordinated boron compound represented by the above formula (3), the reaction conditions in the step (I) and the polymerization conditions in the step (II) also include those specifically mentioned above. Further, those specifically mentioned above as other monomers can also be copolymerized as necessary in the step (II), together with the boron-containing polymerizable monomer obtained in the step (I) A resin composition comprising the boron-containing polymer that can be produced by the production method described above also falls under the scope of the present invention. Further, when a product having the same structure as that of the boron-containing polymer obtained by the production method of the present invention is obtained by a method other than the production method described above, such a product also falls under the scope of the present invention.

The resin composition of the present invention may make use of the boron-containing polymer in combination with other binder resins in order to adjust the hydrolyzability and to adjust the physical properties of the coating film. The above other binder resins include, for example, chlorinated paraffin, polyvinyl ether, polypropylene sebacate, partially hydrogenated terphenyl, polyvinyl acetate, poly(alkyl (meth) acrylate), polyether polyol, alkyd resin, polyester resin, polyvinyl chloride, siliconoil, wax, vaseline, liquidparaffin, rosin, hydrogenated rosin, naphthenic acid, fatty acids and divalent metal salts thereof.

The incorporated amount of the above-mentioned other binder resins is preferably [other binder resins]:[boron-containing polymer]=0:100 to 70:30 in a mass ratio. A proportion-of the above other binder-resins higher than the above range is not preferable because both excellent long-term antifouling property and anti-cracking property of the coating film will not be secured simultaneously.

The resin composition of the present invention can be incorporated suitably into an antifouling coating. The antifouling coating into which the above resin composition is incorporated also falls under the scope of the invention. The incorporated amount of the above resin composition is generally 0.1 to 80% by mass of the solid content in the antifouling coating. If the amount is less than 0.1% by mass, the resulting coating film is inferior in the antifouling property, while the amount is higher than 80% by mass, there may occur inconveniences such as cracking in the coating film. Preferably, the amount is 1 to 60% by mass.

The antifouling coating of the present invention may be obtained by adding conventional additives such as an antifouling agent, a plasticizer, a pigment, a solvent etc. to the resin composition described above.

The above antifouling agent is not particularly limited and may be any conventional ones, and examples thereof include powders or flakes of metals such as copper, zinc, nickel etc.; metal oxides, metal hydroxides and metal halides such as those of copper, zinc etc.; other metal salts such as cuprous oxide, copper rhodanide etc.; metal carboxylates such as copper naphthenate, copper stearate etc.; metal dithiocarbamates such as zinc dimethyl dithiocarbamate, bis-dimethyl dithiocarbamoyl zinc, ethylene bisdithiocarbamate etc.; thiuramdisulfides such as tetramethyl thiuram disulfide etc.; sulfamides such as phthalylsulfathiazole, sulfur ethidole, sulfanilidepyridine, sulfomethoxine, N,N'-dimethyl-N'-phenyl-N-fluorodichloromethyl thiosulfamide etc.; pyrroles and imidazoles, such as glyodine, fentizole, polycide etc.; thioxanes and thixanthons such as terazole, asterol, miron etc.; imides and amides such as nicarbazin, 3,4,5-tribromosalicyl anilide, N-trichloromethyl mercaptophthalimide, 3,5-dinitrobenzamide, 2,4,6-trichloromaleimide, N-fluorodichloromethyl thiophthalimide etc.; sulfur-containing organic compounds and halogen-containing organic compounds such as 2-methylthio-4-t-butylamino-6-cyclopropylamino-s-triazine, 2,4,5,6-tetrachlorophthalonitrile, N,N'-dimethyl dichlorophenyl urea, 4,5-dichloro-2-n-octyl-3-(2H)isothiazoline, 2-pyridinethiol-1-oxide zinc salt, 2-pyridinethiol-1-oxide copper salt, 2,3,5,6-tetrachloro-4-methylsulfonyl pyridine, 3-iodo-2-propylbutyl carbamate, diiodomethyl p-tolyl sulfone etc.; pyridine-triphenyl borane, stearyl amine-triphenyl borane, and other agrochemicals, medicines, bactericides, etc.

The above plasticizer is not particularly limited, and includes, for example, phthalate-based plasticizers such as dioctyl phthalate, dimethyl phthalate, dicyclohexyl phthalate etc.; aliphatic dibasic ester-based plasticizers such as diisobutyl adipate, dibutyl sebacate etc.; glycol ester-based plasticizers such as diethylene glycol dibenzoate, pentaerythritol alkyl ester etc.; phosphate-based plasticizers such as tricresyl phosphate, trichloroethyl phosphate etc.; epoxy-based plasticizers such as epoxylated soybean oil, octyl epoxy stearate etc.; organic tin-based plasticizers such as dioctyltin laurate, dibutyltin laurate etc.; and trioctyl trimellitate, triacetylene, etc.

The above pigment is not particularly limited, and includes, for example, extender pigments such as precipitated barium sulfate, talc, clay, chalk, silica white, alumina white, bentonite, etc.; and color pigments such as titanium oxide, zirconium oxide, basic lead sulfate, tin oxide, carbon black, graphite, red iron oxide, chromium yellow, phthalocyanine green, phthalocyanine blue, quinacridone, etc.

The above solvent is not particularly limited, and includes, for example, hydrocarbons such as toluene, xylene, ethyl benzene, cyclopentane, octane, heptane, cyclohexane and white spirit; ethers such as dioxane, tetrahydrofuran, ethylene glycol monomethyl ether, ethylene glycol monoethyl ether, ethylene glycol dimethyl ether, ethylene glycol-monobutyl ether, ethylene glycol dibutyl ether, diethylene glycol monomethyl ether and diethylene glycol monoethyl ether; esters such as butyl acetate, propyl acetate, benzyl acetate, ethylene glycol monomethyl ether acetate and ethylene glycol monoethyl ether acetate; ketones such as ethyl isobutyl ketone and methyl isobutyl ketone; and alcohols such as n-butanol and propyl alcohol.

Besides those described above, other additives are not particularly limited, and include, for example, rosin, organic monobasic acids such as monobutyl phthalate and monoctyl succinate etc., camphor, castor oil, etc.

The antifouling coating of the present invention can be prepared for example by adding conventional additives such as other binder resins, an antifouling agent, a plasticizer, a coating-abrasion regulator, a pigment, a solvent etc. to the above resin composition comprising the boron-containing polymer according to the present invention and then mixing them by a mixer such as a ball mill, a pebble mill, a roll mill, a sand grind mill, etc.

A dry coating film can be formed by applying the antifouling coating described above in a usual manner onto the surface of a substrate to be coated and then removing the solvent through evaporation at ordinary temperature or under heating.

The resin composition comprising the boron-containing polymer according to the present invention is a novel compound expressing an excellent antifouling property as a binder resin in an antifouling coating, and it is a hydrolysable resin having a so-called self-polishing property where the resin is gradually hydrolyzed in water to allow abrasion of the coating film.

The antifouling coating incorporated with the resin composition comprising the boron-containing polymer according to the present invention is superior in the antifouling property of the resulting coating film. The-above antifouling coating can be used suitably on ships, structures in water, fishing nets such as farming nets and stationary nets, water conduits, fishing implements, etc.

The resin composition comprising a boron-containing polymer according to the present invention, when incorporated into an antifouling coating, is excellent in the antifouling property of the resulting coating film. The above boron-containing polymer can be synthesized simply and easily according to the production method of the present invention.

The above antifouling coating can be used suitably on ships, structures in water, fishing nets such as farming nets and stationary nets, water conduits, fishing implements, etc.

EXAMPLES

Hereinafter, the present invention is described in more detail by reference to the Examples, which however are not intended to limit the present invention. The term "parts" refers to parts by weight.

Example 1

A four-necked flask equipped with a stirrer, an inlet tube, a dropping funnel and a condenser was charged with 64 parts of xylene and 16 parts of n-butanol, and the mixture was heated and kept at 115° C. To this solution was added a mixture of 62.8 parts of methyl methacrylate, 30.8 parts of 2-ethylhexyl acrylate, 6.4 parts of acrylic acid and 2.0 parts of t-butylperoxy 2-ethylhexanoate dropwise over 3 hours, and 30 minutes thereafter, a mixture of 16 parts of xylene, 4 parts of n-butanol and 0.2 part of t-butylperoxy 2-ethylhexanoate was added dropwise thereto over 30 minutes, and further the reaction mixture was kept at the same temperature for 90 minutes to give a resin solution 1 with a solid content of 50% by mass. The resultant resin had a solid acid value (Av) of 50 mg KOH/g and a number average molecular weight of 10000.

A four-necked flask equipped with a stirrer, an inlet tube, a dropping funnel and a condenser was charged with 32.1 parts of a triphenyl borane-pyridine complex and 265 parts of xylene, and the mixture was stirred. To this was added 224.4 parts of the resin solution 1 obtained above, then the mixture was heated to 80° C. and stirred for 4 hours to proceed the reaction. The volatile components xylene and benzene were distilled away from this reaction vessel at 60 to 70° C. under reduced pressure, whereby a brown resin solution A with a resin solid content of 50% by weight was obtained.

Examples 2 to 4

Resin solutions B to D were obtained in the same manner as in Example 1 except that the compositions shown in Table 1 were used to produce resin solutions 2 to 4, and the resin solutions shown in Table 2 and boron in the amounts shown in Table 3 were used.

In Table 2, the boron component indicates the nitrogen atom-coordinated boron compound represented by the formula (3). The values in Table 3 are expressed in parts by weight.

TABLE 1

| Resin | 1 | 2 | 3 | 4 |
|---|---|---|---|---|
| Xylene | 64.0 | 64.0 | 64.0 | 64.0 |
| n-Butanol | 16.0 | 16.0 | 16.0 | 16.0 |
| Methyl methacrylate | 62.8 | 56.8 | | |
| 2-Ethylhexyl acrylate | 30.8 | 30.4 | | |
| Ethyl acrylate | | | 9.6 | 7.3 |
| 2-Ethylhexyl methacrylate | | | 28.7 | 22.0 |
| Cyclohexyl methacrylate | | | 15.0 | 15.0 |
| Methoxy polyethylene glycol methacrylate (n = 9) | | | 30.0 | 30.0 |
| Acrylic acid | 6.4 | 12.8 | 16.7 | 25.7 |
| t-Butylperoxy 2-ethylhexanoate | 2.0 | 2.0 | 2.0 | 2.0 |
| Xylene | 16.0 | 16.0 | 16.0 | 16.0 |
| n-Butanol | 4.0 | 4.0 | 4.0 | 4.0 |
| t-Butylperoxy 2-ethylhexanoate | 0.2 | 0.2 | 0.2 | 0.2 |

TABLE 3

| Resin | Resin Varnish | Boron Component |
|---|---|---|
| A | 224.4 (50% solution) | 32.1 |
| B | 112.2 (50% solution) | 36.8 |
| C | 86.3 (50% solution) | 32.1 |
| D | 56.1 (50% solution) | 51.2 |

TABLE 2

| Resin | Resin | Boron component $R^2$ | Y |
|---|---|---|---|
| A | Resin 1 (AV = 50) | Ph |  |
| B | Resin 2 (AV = 100) | n-$C_4H_9$ | n-$C_{12}H_{25}NH_2$ |
| C | Resin 3 (AV = 130) | Ph |  |
| D | Resin 4 (AV = 200) | Ph | n-$C_{18}H_{37}NH_2$ |

1. Preparation of Coatings

The resin solutions obtained in Examples 1 to 4 were used, and according to the formulations shown in Table 4, the respective components were dispersed by a disperser to prepare coatings a to g.

The values in Table 4 are expressed in parts by weight.

TABLE 4

| | a | b | c | d | e | f | g |
|---|---|---|---|---|---|---|---|
| Resin solution A | 40 | | | | | | |
| Resin solution B | | 40 | 40 | | | | |
| Resin solution C | | | | 35 | 40 | | |
| Resin solution D | | | | | | 40 | 45 |
| Cuprous oxide | | 25 | | | | 30 | |
| Zinc white | 10 | 5 | 15 | 10 | 10 | 5 | 5 |
| Titanium oxide | 15 | | 15 | 21 | 15 | | 12 |
| Red iron oxide | | 5 | | | | 3 | |
| Phthalocyanine blue | | | | | 5 | | 7 |
| 4,5-Dichloro-2-n-octyl-3(2H)isothiazolone | | | | | | | 3 |
| Pyridine-triphenyl borane | 5 | | | | 7 | 3 | |
| N-(fluorodichloromethylthio)phthalimide | | | | | 5 | 3 | |
| Zinc pyrithion | 5 | 5 | | | | | 3 |
| Copper pyrithion | | | 5 | | | 4 | |
| Colloidal silica | 3 | 3 | 3 | 3 | 3 | 4 | 3 |
| Chlorinated paraffin | 2 | | 2 | | 2 | | 2 |
| Polyvinyl ethyl ether | | 2 | | 4 | | | 4 |
| Dioctyl phthalate | 3 | | 2 | | 3 | | |
| Rosin | | | | | | 2 | |

TABLE 4-continued

|  | a | b | c | d | e | f | g |
|---|---|---|---|---|---|---|---|
| n-Butanol | 3 | 3 | 3 | 5 | 3 | 5 | 3 |
| Xylene | 14 | 12 | 13 | 12 | 14 | 6 | 13 |

2. Evaluation of the Antifouling Property

Each coating obtained above was applied onto a blast panel which had been coated with a rust preventing coating in advance, to form a coating film having a dry film thickness of 250 μm, and then left in a room for 2 days to give a test panel. This test panel was used to evaluate the antifouling property in a creature-adhering test on an experimental raft installed in Marine Laboratories in Nippon Paint Co., Ltd., in Tamano City, Okayama. For 24 months after the start of immersion of the raft, the ratio of the creature-adhering area to the area of the coating film was 0%, indicating good antifouling property.

Antifouling coatings prepared with resins A to D obtained in Examples 1 to 4 could demonstrate excellent antifouling property to prevent the adhesion of ocean creatures.

What is claimed is:

1. A resin composition which comprises a boron-containing polymer having, in a side chain or at a terminal thereof, at least one group represented by the following formula (1):

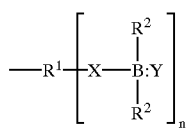

(1)

in the formula, $R^1$ is a part of an acid group; $R^2$ groups are the same or different and each represents a substituted or unsubstituted alkyl or aryl; X represents an oxygen or sulfur atom; Y represents a primary to tertiary amine or a heterocyclic compound containing a substituted or unsubstituted nitrogen atom; and n is 1 or 2.

2. The resin composition according to claim 1, wherein $R^1$ is represented by the following formula (2):

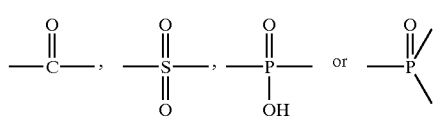

(2)

3. An antifouling coating which comprises the resin composition according to claim 1.

4. An antifouling coating which comprises the resin composition according to claim 2.

5. A production method of a boron-containing polymer which comprises a step of reacting a polymer having at least one acid group in a side chain or at a terminal thereof, with a nitrogen atom-coordinated boron compound represented by the following formula (3):

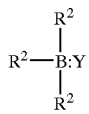

(3)

in the formula, $R^2$ groups are the same or different and each represents a substituted or unsubstituted alkyl or aryl; and Y represents a primary to tertiary amine or a heterocyclic compound containing a substituted or unsubstituted nitrogen atom.

6. The production method of a boron-containing polymer according to claim 5, wherein the acid group is a carboxylic acid group, a sulfonic acid group or a phosphoric acid group.

7. A resin composition which comprises a boron-containing polymer obtainable by the production method of the boron-containing polymer according to claim 5.

8. An antifouling coating which comprises the resin composition according to claim 7.

9. A resin composition which comprises a boron-containing polymer obtainable by the production method of the boron-containing polymer according to claim 6.

10. A production method of a boron-containing polymer which comprises a step (I) of reacting a polymerizable organic acid with a nitrogen atom-coordinated boron compound represented by the following formula (3):

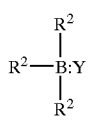

(3)

in the formula, $R^2$ groups are the same or different and each represents a substituted or unsubstituted alkyl or aryl; and Y represents a primary to tertiary amine or a heterocyclic compound containing a substituted or unsubstituted nitrogen atom, and a step (II) of polymerizing a monomer component comprising a boron-containing polymerizable monomer obtained in said step (I).

11. The production method of a boron-containing polymer according to claim 10, wherein the polymerizable organic acid is a polymerizable organic carboxylic acid, a polymerizable organic sulfonic acid or a polymerizable organic phosphoric acid.

12. A resin composition which comprises a boron-containing polymer obtainable by the production method of the boron-containing polymer according to claim 10.

13. A resin composition which comprises a boron-containing polymer obtainable by the production method of the boron-containing polymer according to claim 11.

* * * * *